United States Patent
Eun

(10) Patent No.: US 11,359,902 B2
(45) Date of Patent: Jun. 14, 2022

(54) LENGTH MEASUREMENT DEVICE AND SYSTEM

(71) Applicant: INCHON SURVEY INSTRUMENT. CO. LTD., Incheon (KR)

(72) Inventor: Hi Song Eun, Incheon (KR)

(73) Assignee: INCHON SURVEY INSTRUMENT. CO. LTD., Incheon (KR)

( * ) Notice: Subject to any disclaimer, the term of this patent is extended or adjusted under 35 U.S.C. 154(b) by 410 days.

(21) Appl. No.: 16/613,898

(22) PCT Filed: Jul. 23, 2018

(86) PCT No.: PCT/KR2018/008272
§ 371 (c)(1),
(2) Date: Nov. 15, 2019

(87) PCT Pub. No.: WO2019/132149
PCT Pub. Date: Jul. 4, 2019

(65) Prior Publication Data
US 2020/0080827 A1  Mar. 12, 2020

(30) Foreign Application Priority Data
Dec. 29, 2017  (KR) .................. 10-2017-0183741

(51) Int. Cl.
*G01B 3/10*  (2020.01)
*G01B 3/1041*  (2020.01)
(Continued)

(52) U.S. Cl.
CPC .......... *G01B 3/1041* (2013.01); *G01B 3/1084* (2013.01); *G01B 21/02* (2013.01); *G08C 17/02* (2013.01)

(58) Field of Classification Search
CPC .......... G01B 3/1061; G01B 2003/1064; G01B 2003/1069
(Continued)

(56) References Cited

U.S. PATENT DOCUMENTS 4,242,574 A  12/1980  Grant
4,551,847 A  11/1985  Caldwell
(Continued)

FOREIGN PATENT DOCUMENTS

CN  87102292 A  1/1988
CN  200982847 Y  11/2007
(Continued)

OTHER PUBLICATIONS

English Translation (machine translation) of Chinese Office Action, issued Jan. 5, 2021.
(Continued)

*Primary Examiner* — George B Bennett
(74) *Attorney, Agent, or Firm* — Bond Schoeneck & King, PLLC; George McGuire

(57) ABSTRACT

A length measurement device comprises: a tape which is wound on a reel received in a case, one end of which is pulled out of the case so as to measure the length of an object, and which has a barcode formed on one surface thereof; a first measurement unit for recognizing the barcode on the tape so as to generate a first measurement value of the length along which the tape is pulled out of the case; a second measurement unit for sensing a rotation angle of the reel so as to generate a second measurement value of the length along which the tape is pulled out of the case; and a control unit for making the first measurement value and the second measurement value mutually compensate for each other so as to convert same into the pulled-out length information of the tape.

15 Claims, 9 Drawing Sheets

(51) Int. Cl.
*G01B 3/1084* (2020.01)
*G01B 21/02* (2006.01)
*G08C 17/02* (2006.01)

(58) Field of Classification Search
USPC .................................................. 33/762, 763
See application file for complete search history.

(56) References Cited

U.S. PATENT DOCUMENTS

| | | | | |
|---|---|---|---|---|
| 4,896,280 | A | | 1/1990 | Phillips |
| 5,433,014 | A | * | 7/1995 | Falk ........................ G01D 5/347 |
| | | | | 455/67.11 |
| 5,894,678 | A | * | 4/1999 | Masreliez ............... G01B 7/026 |
| | | | | 33/762 |
| 6,868,620 | B2 | * | 3/2005 | Sanoner ................... G01B 3/11 |
| | | | | 33/763 |
| 6,898,865 | B2 | * | 5/2005 | Rodi ....................... G01B 7/003 |
| | | | | 33/708 |
| D607,354 | S | * | 1/2010 | Noguchi ................ G01B 7/026 |
| | | | | D10/72 |
| 11,092,417 | B1 | * | 8/2021 | Luckey ................. G01B 3/1003 |
| 11,199,391 | B2 | * | 12/2021 | Wang .................... G01B 3/1061 |
| 2014/0250708 | A1 | * | 9/2014 | Bauer .................... G01B 3/1061 |
| | | | | 33/760 |
| 2019/0257633 | A1 | * | 8/2019 | Levisohn ............ G01D 5/34746 |
| 2021/0131781 | A1 | * | 5/2021 | Bridges ................ G01B 3/1056 |
| 2021/0361187 | A1 | * | 11/2021 | Bassez ................. G01B 3/1041 |
| 2022/0040772 | A1 | * | 2/2022 | Wille .................... G01B 3/1071 |

FOREIGN PATENT DOCUMENTS

| | | |
|---|---|---|
| CN | 101191715 A | 6/2008 |
| CN | 101273244 A | 9/2008 |
| CN | 105258587 A | 1/2016 |
| CN | 105423982 A | 3/2016 |
| CN | 106461365 A | 2/2017 |
| CN | 106813544 A | 6/2017 |
| CN | 107305115 A | 10/2017 |
| EP | 0474782 B1 | 1/1996 |
| GB | 690458 A | 4/1953 |
| GB | 2236858 B | 8/1994 |
| JP | 06039198 B2 | 5/1994 |
| JP | 08030644 B2 | 3/1996 |
| JP | 2002013901 A | 1/2002 |
| JP | 2008039732 A | 2/2008 |
| KR | 1020000024064 A | 5/2000 |
| KR | 1020170107744 A | 1/2018 |

OTHER PUBLICATIONS

International Search Report and Written Opinion Form PCT/ISA/210 and PCT/ISA/237, International Application No. PCT/KR2018/008272, pp. 1-10, International Filing Date Jul. 23, 2018, dated Oct. 17, 2018.

* cited by examiner

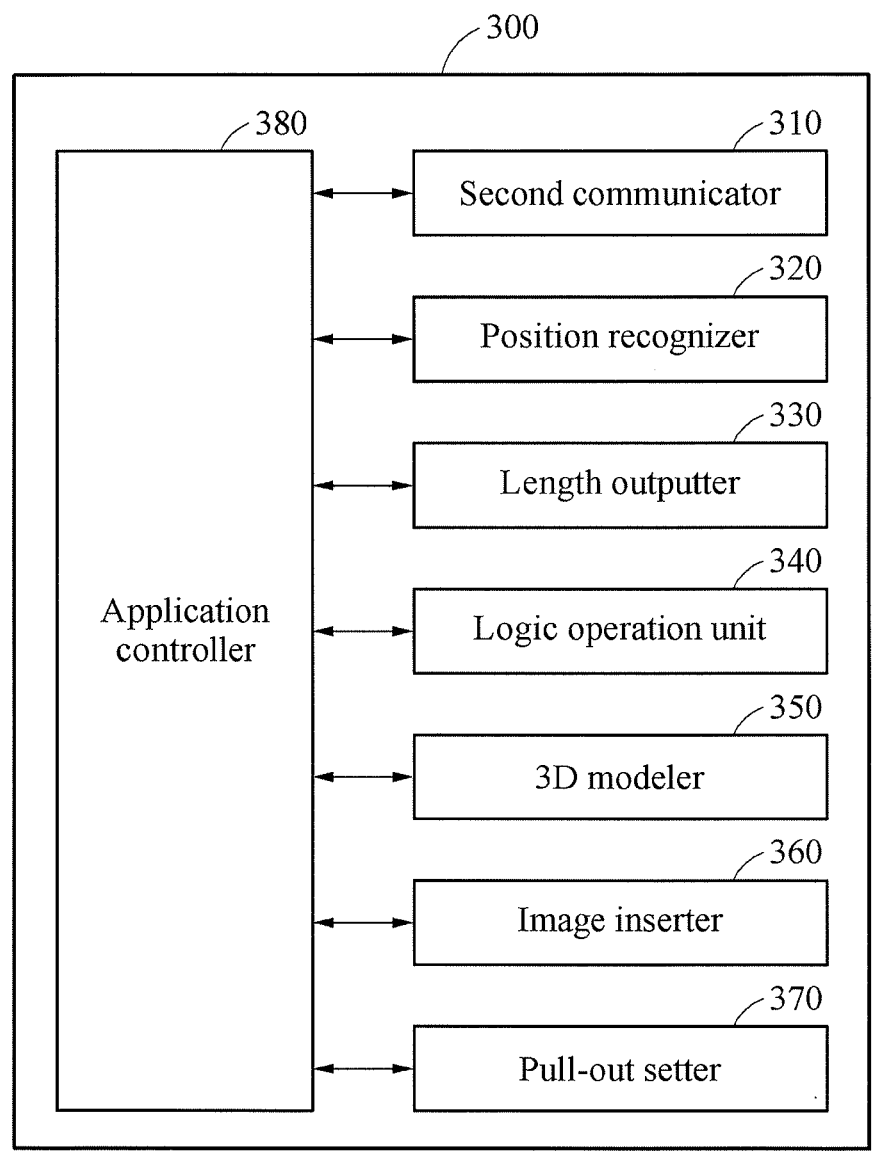

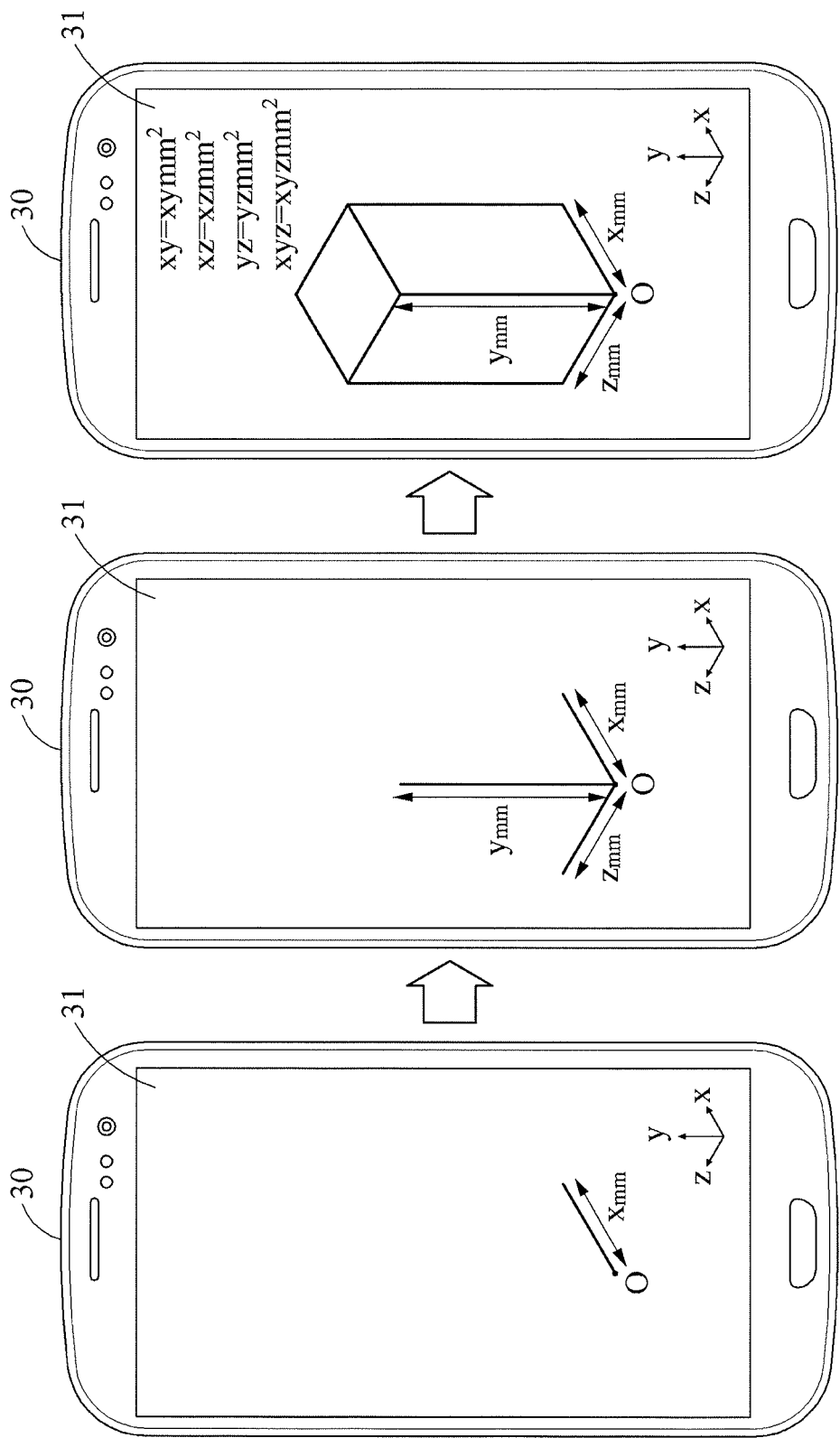

LENGTH MEASUREMENT DEVICE AND SYSTEM

CROSS-REFERENCE TO RELATED APPLICATIONS

This application is a US national phase application of international patent application number PCT Application No.: PCT/KR2018/008272, filed on Jul. 23, 2018, which claims priority to Korean patent application No. 10-2017-0183741, filed Dec. 29, 2017, the disclosures of both of which are incorporated herein by reference in their entireties.

TECHNICAL FIELD

Embodiments relate to a length measurement device and system.

BACKGROUND ART

In general, a tape measure is provided in the shape of a tape with markings allowing for a measure of length on a surface thereof, and is used to measure the width or the area of a predetermined space or to measure the size, the length or the width of an object.

There are various types of tape measures. A typical tape measure includes a ruler wound like coils, the ruler with measurement markings on a surface thereof, an inner space to store the ruler, and a case including a slot to guide the ruler stored in the inner space to be pulled out and returned therethrough. A user measures the length of an object by placing an end of the ruler at one end of the object, pulling out the tape measure, and reading a marking reaching the other end of the object. It takes a relatively long time to measure the length of an object using this tape measure since the measurement reading needs to be performed with eyes.

To overcome the foregoing, tape measures that digitally display a result at the same time measuring a distance have been developed. In this relation, there is a related art, Korean Patent Application Publication No. 2000-0024064 (published on May 6, 2000) disclosing a "tape measure" that senses a digital code display provided in a woven configuration of conductors woven between a warp and a weft of fiber and displays the same on an LCD. However, the tape measure has errors during real-time measurement due to the distance between the conductors. Further, the tape measure simply displays the length on the LCD and does not include a storage device, and thus the measured length needs to be written manually.

DISCLOSURE OF INVENTION

Technical Goals

An aspect provides a length measurement device and system that may improve the accuracy of measuring a pulled-out length of a tape by providing a plurality of measurers configured to measure the pulled-out length of the tape and mutually comparing values measured by the plurality of measurers.

An aspect provides a length measurement device and system that may verify in real time a value measured by a distance measurer configured to measure a distance between a tape configured to measure a length of an object and the object at a more remote distance.

An aspect provides a length measurement device and system that may provide a stopper configured to restrict a pulled-out distance of a tape, to restrict the pulled-out distance based on a set distance.

An aspect provides a length measurement device and system that may measure a length of an object using various methods of calculating a distance measurement angle of a distance measurer.

An aspect provides a length measurement device and system that may transmit in real time a measured length to a user terminal by transmitting and receiving measurement information through a communication with the user terminal.

An aspect provides a length measurement device and system that may provide convenience to a user by receiving a variety of information with respect to length measurement from a measurement application of a user terminal.

Technical Solutions

According to an aspect, there is provided a length measurement device.

The length measurement device may include a tape wound on a reel received in a case and configured to measure a length of an object by pulling one end thereof out of the case, the tape with a barcode formed on one surface thereof, a first measurer configured to generate a first measurement value with respect to a pulled-out length of the tape by recognizing the barcode of the tape, a second measurer configured to generate a second measurement value with respect to the pulled-out length of the tape by sensing a rotation angle of the reel, and a controller configured to mutually correct the first measurement value and the second measurement value and convert the corrected first and second measurement values into pulled-out length information of the tape.

The length measurement device may further include a storage configured to store the pulled-out length information, a display configured to convert the pulled-out length information into a value and display the value, and a stopper configured to restrict a pull-out of the tape.

The controller may be configured to control the stopper based on the stored pulled-out length information, when the pulled-out length information of the tape stored in the storage is output to the display.

The length measurement device may further include a distance measurer provided on one side of the case and configured to generate measurement distance information by remotely measuring a distance to the object.

The storage may be further configured to store the measurement distance information, and the controller may be configured to control the stopper based on the stored measurement distance information, when the measurement distance information stored in the storage is output to the display.

The distance measurer may further include a distance measurement sensor configured to measure the distance to the object, an angle adjuster configured to adjust a measurement angle of the distance measurement sensor, and an angle sensor configured to generate angle information by sensing a direction angle and a gradient of the angle adjuster.

The length measurement device may further include an electronic level configured to generate horizontality information by measuring a horizontal level of the length measurement device.

According to an aspect, there is provided a length measurement system.

The length measurement system may include a length measurement device configured to mutually correct a first measurement value and a second measurement value and convert the corrected first and second measurement values into pulled-out length information of a tape configured to be pulled out of a case to measure a length of an object, and transmit the pulled-out length information, the first measurement value being generated by recognizing a barcode formed on one surface of the tape and the second measurement value being generated by sensing a rotation angle of a reel on which the tape is wound. and a user terminal including a measurement application configured to receive the pulled-out length information and visually display a pulled-out length of the tape.

The measurement application may include a second communicator configured to receive the pulled-out length information, a position recognizer configured to recognize a position at which the pulled-out length information is to be output, a length outputter configured to output the pulled-out length information at the recognized position on a screen of the user terminal, and a logic operation unit configured to calculate and output a cross-sectional area and a volume of the object by calculating the pulled-out length information.

The position recognizer may be configured to recognize an axis X, Y or Z as the position at which the pulled-out length information is to be output, based on a predetermined origin.

The measurement application may further include a 3D modeler configured to model the pulled-out length information of the axis X, Y or Z in a 3D form.

The position recognizer may be configured to recognize a position designated through user terminal as the position at which the pulled-out length information is to be output.

The measurement application may further include an image inserter configured to insert an image designated through the user terminal as a background on the screen of the user terminal.

The length measurement device may further include a stopper configured to restrict the pulled-out length of the tape, and the measurement application may further include a pull-out setter configured to receive pulled-out length information input through the user terminal, and generate a pull-out setting signal to control the stopper based on the received pulled-out length information.

The length measurement device may include a distance measurer including a distance measurement sensor configured to generate measurement distance information by remotely measuring a distance to the object, an angle adjuster configured to adjust a measurement angle of the distance measurement sensor, and an angle sensor configured to generate angle information by sensing a direction angle and a gradient of the angle adjuster.

The position recognizer may be configured to recognize a position at which the measurement distance information is to be output, based on a predetermined origin and the angle information, the length outputter may be configured to output the measurement distance information at the recognized position, and the logic operation unit may be configured to output the measurement distance information by calculating X-axial, Y-axial and Z-axial distances based on the angle information.

Effects

According to embodiments, it is possible to improve the accuracy of measuring a pulled-out length of a tape by providing a plurality of measurers configured to measure the pulled-out length of the tape and mutually comparing values measured by the plurality of measurers.

According to embodiments, it is possible to verify in real time a value measured by a distance measurer configured to measure a distance between a tape configured to measure a length of an object and the object at a more remote distance.

According to embodiments, it is possible to provide a stopper configured to restrict a pulled-out distance of a tape, to restrict the pulled-out distance based on a set distance.

According to embodiments, it is possible to measure a length of an object using various methods of calculating a distance measurement angle of a distance measurer.

According to embodiments, it is possible to transmit in real time a measured length to a user terminal by transmitting and receiving measurement information through a communication with the user terminal.

According to embodiments, it is possible to provide convenience to a user by receiving a variety of information with respect to length measurement from a measurement application of a user terminal.

BRIEF DESCRIPTION OF DRAWINGS

FIG. 6 is a block diagram illustrating a measurement application according to an embodiment.

FIG. 7 illustrates an example of an operation of a measurement application according to an embodiment.

BEST MODE FOR CARRYING OUT THE INVENTION

Figure 1:
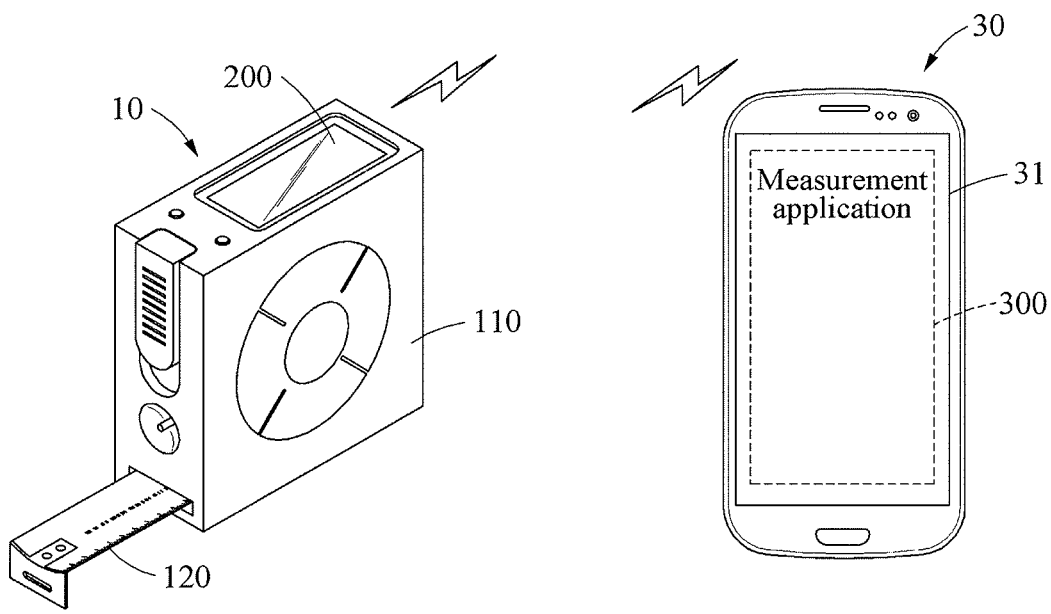
FIG. 1 illustrates a length measurement system according to an embodiment.

Hereinafter, some embodiments will be described in detail with reference to the accompanying drawings. Regarding the reference numerals assigned to the components in the drawings, it should be noted that the same components will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The same name may be used to describe a component included in the embodiments described above and a component having a common function. Unless otherwise mentioned, the descriptions on the embodiments may be applicable to the following embodiments and thus, duplicated descriptions will be omitted for conciseness.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

FIG. 1 illustrates a length measurement system according to an embodiment.

Referring to FIG. 1, a length measurement system 1 may include a length measurement device 10 and a user terminal 30 including a measurement application 300. The length measurement device 10 may measure a length of an object or a distance to the object, and display the measured length or distance on a display 200, which will be described later. Further, the length measurement device 10 may convert the measured length or distance into a digital signal and transmit the same to the user terminal 30 through communication.

The user terminal 30 may include a communication module (not shown) to receive data of the length measurement device 10 and visually display the length or distance on a screen thereof. The user terminal 30 may include all devices on which the measurement application is installable, for example, a smart phone, a PDA, a tablet PC, a PC, and a laptop. Further, the length measurement device 10 and the user terminal 30 may use data communication methods for effectively transmitting data, such as RF communication, WiFi, WCDMA, LTE, Bluetooth, IrDA, Zigbee, and UWB. Herein, for ease of description, embodiments will be described based on a communication method using Bluetooth, but are not limited thereto.

Figure 2:
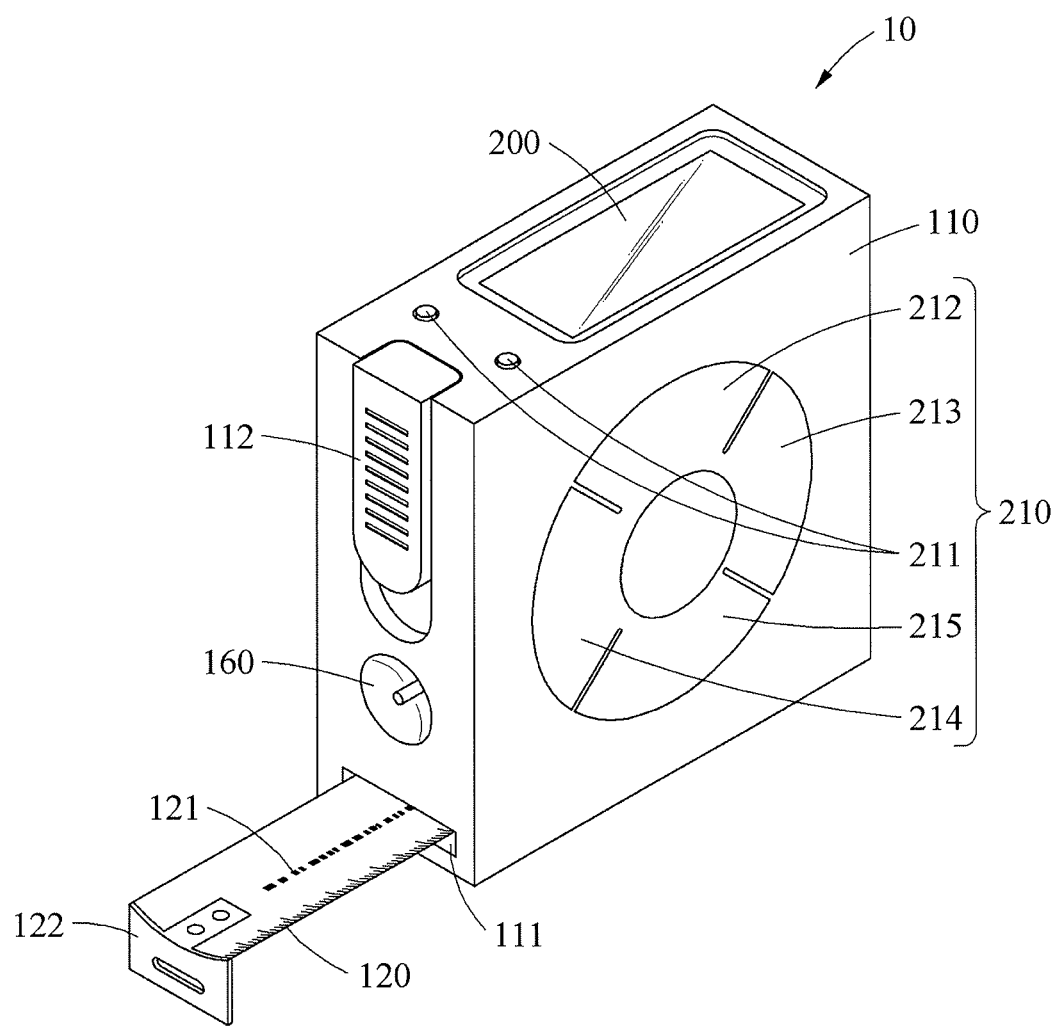
FIG. 2 is a perspective view illustrating a length measurement device according to an embodiment.
Figure 3:
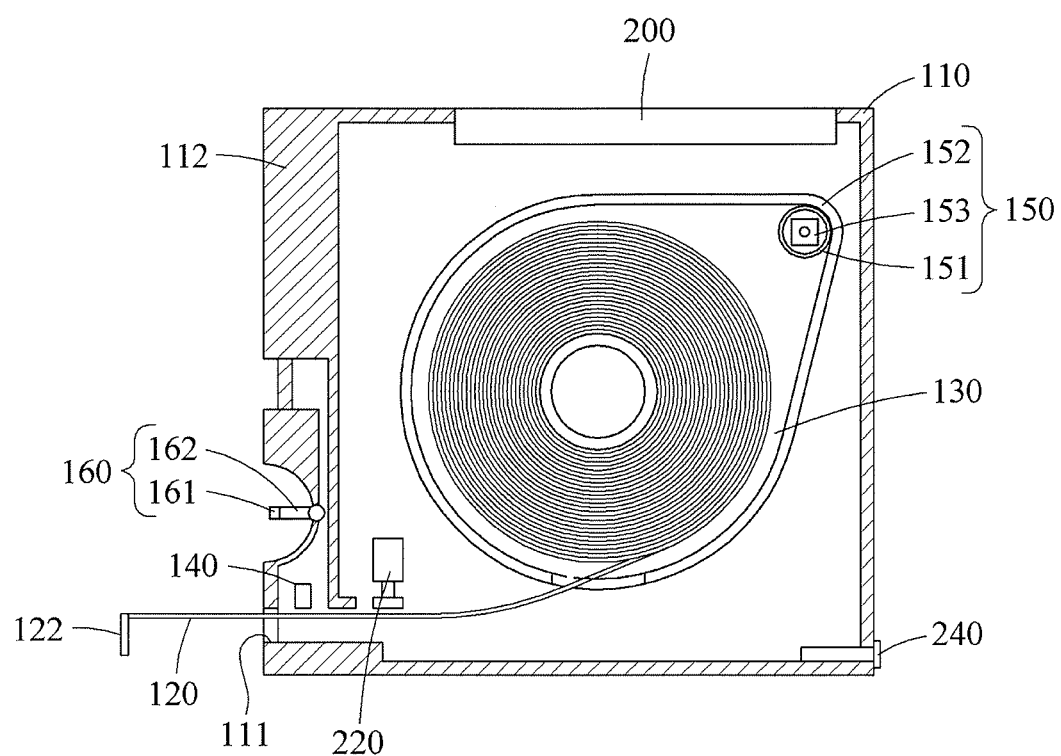
FIG. 3 is a cross-sectional view illustrating a length measurement device according to an embodiment.
Figure 4:
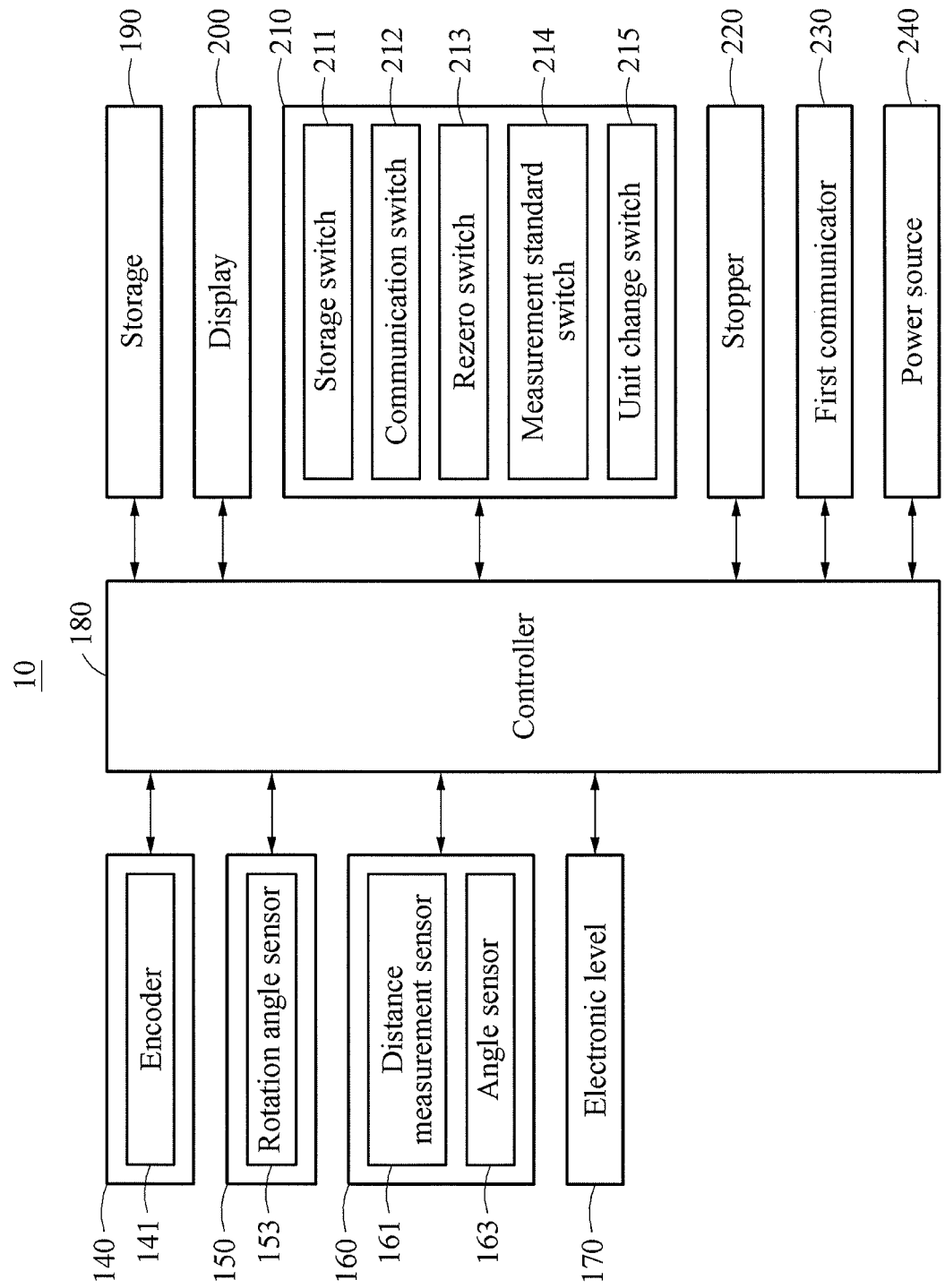
FIG. 4 is a block diagram illustrating a length measurement device according to an embodiment.

FIG. 2 is a perspective view illustrating a length measurement device according to an embodiment, FIG. 3 is a cross-sectional view illustrating the length measurement device according to an embodiment, and FIG. 4 is a block diagram illustrating the length measurement device according to an embodiment.

Referring to FIGS. 2 through 4, the length measurement device 10 may include a case 110, a tape 120, a reel 130, a first measurer 140, a second measurer 150, a distance measurer 160, an electronic level 170, a controller 180, a storage 190, the display 200, a switch 210, a stopper 220, a first communicator 230 and a power source 240.

The case 110 may protect the components of the length measurement device 10 by receiving the components therein. The case 110 may be provided in any shape that may receive the components therein. Meanwhile, the case 110 may include a pull-out slot 111 through which the tape 120 is pulled out and returned, which will be described later.

The tape 120 may be received in the case 110, such that one end thereof may be pulled out of the case 110 or returned. The tape 120 may include measurement markings formed at predetermined intervals on one surface thereof, such that a user may measure the length of the object by reading the measurement markings of the tape 120 pulled out. Further, the tape 120 may include a barcode 121 formed on the one surface thereof. For example, the barcode 121 may be formed by combining bars with different widths, such that a pulled-out length of the tape 120 pulled out through the pull-out slot 111 may be recognized by the first measurer 140, which will be described later.

Further, the tape 120 may further include a hook 122 to maintain the tape 120 to be hung on the pull-out slot 111 of the case 110. The embodiments illustrate the tape 120, but are not limited thereto, and may be modified in various shapes such as a thread, a string, and a band.

The tape 120 may be wound on the reel 130, and the reel 130 may rotate as the tape 120 is pulled out and returned. For example, the reel 130 may be combined in the case 110 such that a central portion thereof is rotatable, and the tape 120 may be wound thereon. The reel 130 may include an elastic member wound in the form of coils on an inner side thereof and connected to the tape 120. The elastic member (not shown) may be compressed when the tape 120 is pulled out, and return the tape 120 by winding the tape 120 with an elastic force to return to its original shape. In this example, the case 110 may include a holder 112 on one side thereof to hold the tape 120.

The first measurer 140 may generate a first measurement value with respect to the pulled-out length of the tape 120 by recognizing the barcode 121 of the tape 120. For example, the first measurer 140 may include an encoder 141 configured to output a pulse corresponding to a change in the position of the tape 120 by recognizing the barcode 121. The first measurer 140 may be received in the case 110 to be disposed adjacent to the pull-out slot 111. The first measurer 140 may output the first measurement value with respect to the pulled-out length of the tape 120 by recognizing the barcode 121.

The second measurer 150 may generate a second measurement value by sensing a rotation angle of the reel 130. For example, the second measurer 150 may include a drum 151 configured to rotate through interoperation with the reel 130, a rotation transmitter 152 configured to transmit a rotation of the reel 130 to the drum 151, and a rotation angle sensor 153 configured to generate the first measurement value by sensing a rotation angle of the drum 151. The drum 151 may rotate in response to the rotation transmitted from the reel 130 through the rotation transmitter 152. In this example, the rotation angle sensor 153 may output the second measurement value with respect to the pulled-out distance of the tape 120 by sensing a variation of the rotation angle of the drum 151.

The rotation angle sensor 153 may be an oscillator-type sensor which measures a rotation count or a rotation angle by measuring the number of teeth through an electronic coil placed in vicinity of a toothed ferromagnetic substance disposed on a portion of a rotation shaft of the drum 151. However, the embodiments are not limited thereto, the rotation angle sensor 153 may be any sensor configured to detect the rotation angle of the drum 151, such as a Hall effect sensor, a magnetoresistive sensor, a generator-type sensor, an electronic sensor, or a photoelectric sensor.

The distance measurer 160 may be provided on one side of the case 110 to generate a distance measurement value by remotely measuring the distance to the object. The distance measurer 160 may be coupled to one surface of the case 110, for example, the surface on which the pull-out slot 111 is positioned, to perform the measurement in the pulled-out direction of the tape 120. Further, the distance measurer 160 may perform the measurement by adjusting a measurement angle. The distance measurer 160 may include a distance measurement sensor 161, an angle adjuster 162, and an angle sensor 163.

The distance measurement sensor 161 may measure the distance to the object. For example, the distance measurement sensor 161 may fire a laser beam, a ultraviolet ray or an ultrasonic wave toward the object and receive a signal returning after reflection. The distance measurement sensor 161 may generate the distance measurement value by receiving the returning signal.

Figure 5A:
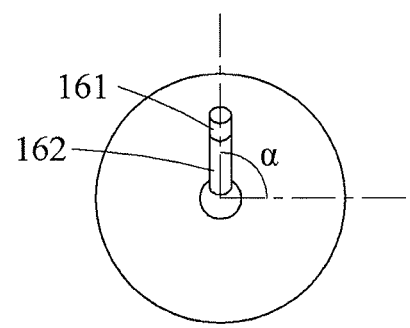
FIG. 5A is a front view illustrating an angle adjuster according to an embodiment.
Figure 5B:
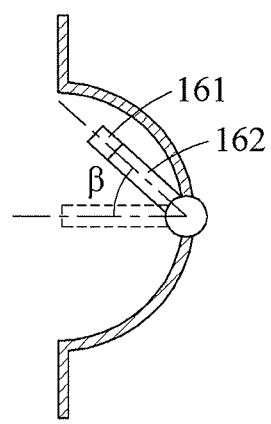
FIG. 5B is a cross-sectional side view illustrating a cross section of an angle adjuster according to an embodiment.

Referring to FIGS. 5A and 5B, the angle adjuster 162 may adjust the measurement angle of the distance measurement sensor 161. For example, the distance measurement sensor 161 may be coupled to one side of the angle adjuster 162, and another side of the angle adjuster 162 may be connected to the case 110 in the form of a universal joint.

Meanwhile, the angle adjuster 162 may be coupled to the case 110 such that the distance measurement sensor 161 may not protrude from the end on the outer surface of the case 110. In this example, the case 110 may form a hemispheric recess, and the angle adjuster 162 may be coupled to the case 110 by being inserted into the recess. The angle adjuster 162 may be coupled by being inserted, thereby preventing damage.

The angle sensor 163 may generate angle information by sensing a direction angle and a gradient of the angle adjuster 162. Here, the direction angle may be an angle formed by a moving direction of the moved distance measurement sensor and a virtual line formed in a predetermined direction based on the origin, as shown in FIG. 5A, and the gradient may be an angle formed by an initial length direction of the angle adjuster 162 and a length direction of the angle adjuster 162 after adjustment, as shown in FIG. 5B.

The distance measurer 160 may be adjusted to a predetermined angle when measuring the distance to the object, and thereby generate measurement distance information including the measured distance and the angle information sensed by the angle sensor 163.

Referring to FIG. 4 again, the electronic level 170 may measure a horizontal level of the length measurement device 10. For example, the electronic level 170 may include a gyroscope to generate horizontality information to be included in the measurement distance information by measuring the horizontal level of the length measurement device 10. Here, a method of measuring the horizontal level using a gyroscope is a known configuration, and thus description thereof will be omitted.

The controller 180 may mutually correct the first measurement value and the second measurement value and convert the corrected first and second measurement values into pulled-out length information of the tape 120. For example, the controller 180 may correct an error in the first measurement value caused by the intervals of the barcode 121 based on the second measurement value. Further, the controller 180 may correct an error in the second measurement value, in which a rotation count of the reel 130 changes when a winding count of the tape 120, that is, the diameter of a circle formed by the wound tape 120, decreases, based on the first measurement value. In addition, the controller 180 may correct an error in the second measurement value caused by a gap occurring between windings of the tape 120 when the tape 120 is wound, based on the first measurement value. Further, the controller 180 may convert the pulled-out length of the tape 120 or the distance measured by the distance measurer 160 into data. Further, the controller 180 may control the components of the length measurement device 10.

The storage 190 may store the pulled-out length information or the measurement distance information. For example, the storage 190 may include magnetic media, optical media such as CD-ROM discs, and/or DVDs, magneto-optical media such as floptical discs, and hardware storage media such as ROM, RAM, and flash memory, to store the pulled-out length information or the measurement distance information. The storage 190 may store pulled-out length information or measurement distance information of a time point at which a storage switch 211 is manipulated in response to the manipulation of the storage switch 211, which will be described later. The storage 190 may store a plurality of items of pulled-out length information or measurement distance information.

The display 200 may convert the pulled-out length information or the measurement distance information into a value and display the value. The display 200 may convert the pulled-out length information or the measurement distance information into the value and visually display the value. Further, the display 200 may receive the pulled-out length information or the measurement distance information stored in the storage 190 and visually display the received pulled-out length information or measurement distance information. The position at which the display 200 is disposed is not limited. However, the display 200 may be preferably disposed to be exposed through the outer surface of the case 110.

The switch 210 may include a plurality of switches configured to control the operation of the controller. The switch 210 may include the storage switch 211, a communication switch 212, a rezero switch 213, a measurement standard switch 214 and a unit change switch 215.

The storage switch 211 may store the pulled-out length information or the measurement distance information, or display the pulled-out length information or the measurement distance information stored in the storage 190 on the display 200. For example, the storage switch 211 may store the pulled-out length information or the measurement distance information being measured, when pressed for a predetermined time. Further, when the storage switch 211 is pressed, the controller 180 may convert the stored pulled-out length information or the measurement distance information into a value and display the value on the display 200.

Further, a plurality of storage switches 211 may be provided. When each of the plurality of storage switches 211 is manipulated, the storage 190 may store or output pulled-out length information or measurement distance information corresponding to each corresponding storage switch. However, the foregoing is merely an example. The storage 190 may sequentially store or output a plurality of items of pulled-out length information or measurement distance information when the storage switch 211 is manipulated.

The communication switch 212 may be a switch configured to operate the first communicator 230, which will be described later. For example, when the communication switch 212 is manipulated, the controller may operate the first communicator 230 to connect to the user terminal 30. Further, when the communication switch 212 is manipulated, the controller may control to transmit the pulled-out length information or the measurement distance information to the user terminal 30.

The rezero switch 213 may be a switch configured to reset the currently measured value to "0". For example, when the rezero switch 213 is manipulated, the controller 180 may reset the current value of the pulled-out length information or the measurement distance information to "0", and calculate pulled-out length information or measurement distance information measured thereafter based on the reset current value and display the calculated pulled-out length information or measurement distance information on the display 200.

The measurement standard switch 214 may be a switch configured to change a measurement standard. For example, the measurement standard switch 214 may be a switch which changes the measurement standard based on the front side or the rear side of the length measurement device 10. That is, when the measurement standard switch 214 is manipulated, the controller 180 may correct the pulled-out length information or the measurement distance information by adding or subtracting the length of the length measurement device 10.

The unit change switch 215 may be a switch configured to change a unit of measurement. For example, when the unit change switch 215 is manipulated, the controller 180 may change a unit of the pulled-out length information or the measurement distance information and display the value of the pulled-out length information or the measurement distance information in the unit on the display 200.

The stopper 220 may restrict a pull-out of the tape 120. For example, the stopper 220 may be provided in the case 110, in the form of a cylinder configured to be extended and contracted, as shown in FIG. 3. A frictional member may be provided at one end of the stopper 220, such that the frictional member may be moved in a direction of one surface of the tape 120 to generate a frictional force to pressurize and stop the tape 120.

Here, when the pulled-out length information or the measurement distance information stored in the storage 190 is output to the display 200, the controller 180 may control the stopper 220 to pull out the tape 120 based on the pulled-out length information or the measurement distance information. That is, the controller 180 may restrict the pulled-out length of the tape to a length corresponding to the stored pulled-out length information or the measurement distance information. In case of a repeated task such as cutting dimension check of the object, the stopper 220 may enable the user to easily perform the task by restricting the pulled-out length of the tape 120 based on the pulled-out length information or the measurement distance information stored in the storage 190.

The first communicator 230 may perform communicate for the length pulled-out length information or the measurement distance information. For example, the first communicator 230 may transmit and receive the pulled-out length information or the measurement distance information to and from the user terminal 30 through Bluetooth communication.

The power source 240 may supply power required to operate the components of the length measurement device 10. For example, the power source 240 may be implemented as a battery. Further, the power source 240 may also be implemented as a solar power battery which is charged with light, by providing a light collecting plate (not shown) on one side of the display 200. However, the foregoing is merely an example. The power source 240 may be supplied through an external power source. Further, the shape of the battery may be suitably modified based on the size of the case.

FIG. 6 is a block diagram illustrating a measurement application according to an embodiment.

Referring to FIG. 6, the measurement application 300 may include a second communicator 310, a position recognizer 320, a length outputter 330, a logic operation unit 340, a 3D modeler 350, an image inserter 360 and a pull-out setter 370.

The second communicator 310 may communicate with the first communicator 230 to transmit or receive data through the communication module of the user terminal 30. The second communicator 310 may receive the pulled-out length information and the measurement distance information of the distance measurer through the first communicator 230, or transmit pulled-out length information to be stored in the storage 190. The pulled-out length information to be stored in the storage 190 may be randomly designated through the user terminal 30.

The position recognizer 320 may recognize a position at which the pulled-out length information is to be output. For example, the position recognizer 320 may recognize an axis X, Y or Z as the position at which the pulled-out length information is to be shown, based on a predetermined origin. In this example, the position recognizer 320 may sequentially recognize the pulled-out length information transmitted from the length measurement device 10 in the X-axial, Y-axial or Z-axial direction based on the predetermined origin. As another example, the position recognizer 320 may recognize a position designated through the user terminal 30 as the position at which the pulled-out length information is to be output. In this example, the position recognizer 320 may recognize a position between one pair of points input into the user terminal 30 through a touchscreen 31 or a separate input device (not shown), as the position at which the pulled-out length information is to be output. As still another example, the position recognizer 320 may recognize the position at which the pulled-out length information is to be output, based on the predetermined origin and the angle information.

The length outputter 330 may output the pulled-out length information or the measurement distance information at the recognized position on the screen of the user terminal 30. For example, the length outputter 330 may output a line with the same scale of length as the value measured from the pulled-out length information or the measurement distance information, at the recognized position. Further, when at least one pair of points are already designated, the length outputter 330 may input only a value between the one pair of points.

Further, the length outputter may output the measurement distance information at the recognized position. Here, the length outputter may output the length based on the angle information and the horizontality information included in the measurement distance information.

The logic operation unit 340 may calculate a cross-sectional area and a volume of the object by calculating the pulled-out length information. For example, when the length outputter 330 outputs the pulled-out length information at a position of the axis X, the axis Y or the axis Z, the logic operation unit 340 may calculate the cross-sectional area and the volume by calculating the X-axial, Y-axial or Z-axial length. Further, even when the pulled-out length information is output between a plurality of pairs of points, the logic operation unit 340 may calculate the cross-sectional area and the volume with respect to overlapping points.

Further, the logic operation unit 340 may also calculate and output X-axial, Y-axial and Z-axial distances by calculating the measurement distance information based on the angle information. Here, the logic operation unit 340 may correct the angle information based on the horizontality information. For example, the logic operation unit 340 may correct the direction angle and the gradient by generating an angle in the angle information based on the horizontality information of the length measurement device.

The 3D modeler 350 may model the length information of the axis X, Y or Z in a 3D form. For example, when the pulled-out length information of the axis X, Y or Z is visually output to the user terminal by the length outputter 330, the 3D modeler 350 may form a 3D model by combining the length information of the axis X, Y or Z.

The image inserter 360 may insert an image designated through the user terminal 30 as a background on the screen of the user terminal 30. For example, the image inserter 360 may designate one of images stored in the user terminal 30 and insert the designated image as the background.

The pull-out setter 370 may receive the pulled-out length information input through the user terminal 30, and generate a signal to control the stopper 220 based on the received pulled-out length information. For example, the pull-out setter 370 may generate an input event to input the pulled-out length information through the user terminal 30. When the pulled-out length information is input at the input event, the pull-out setter 370 may generate the information as a pull-out setting signal and transmit the pull-out setting signal to the second communicator 310.

When the pull-out setting signal is received, the controller 180 of the length measurement device 10 may display pulled-out length information corresponding to the pull-out setting signal on the display. Further, the controller 180 may control the pulled-out length of the tape 120 by controlling the stopper 220 based on the pulled-out length information.

An application controller 380 may mutually control the components of the measurement application 300. Further, the application controller 380 may change settings of the position recognizer 320 selected through the user terminal 30.

Hereinafter, an operation of the measurement application will be described in detail with reference to FIGS. 7 through 9.

FIG. 7 illustrates an example of an operation of a measurement application according to an embodiment.

Referring to FIG. 7, the application controller 380 may set the settings of the position recognizer 320 such that an axis X, an axis Y, and an axis Z may be sequentially recognized as a position at which the pulled-out length information is to be output, based on a predetermined origin O. Here, the predetermined origin O may be a position preset in the position recognizer 320, or the predetermined origin O may be selected by the user through the user terminal 30.

The length outputter 330 may sequentially output the pulled-out length information or the length measurement information received from the length measurement device 10 at the axis X, the axis Y and the axis Z recognized by the position recognizer 320. For example, the length outputter 330 may form a line corresponding to pulled-out length information or length measurement information received first from the length measurement device 10 on the axis X and output the line together with a value of the length. Then, the length outputter 330 may sequentially output pulled-out length information or length measurement information received to the axis Y and the axis Z.

The logic operation unit 340 may calculate and output the cross-sectional area and the volume of the object by calculating the pulled-out length information and the measurement distance information output by the length outputter 330. In this example, the cross-sectional area and the volume may be calculated and output to the length measurement device 10 in units the same as the units selected with the unit change switch 215.

The 3D modeler 350 may model the length information of the axis X, Y or Z in a 3D form. The 3D modeler 350 may form a 3D model of a hexahedron by copying the lines output to the axis X, the axis Y and the axis Z through a linear array. In this example, when the user selects settings for forming a diameter of a circle through the user terminal 30, the 3D modeler 350 may model the length information in various figures such as a cylinder, and a sphere.

Figure 8:
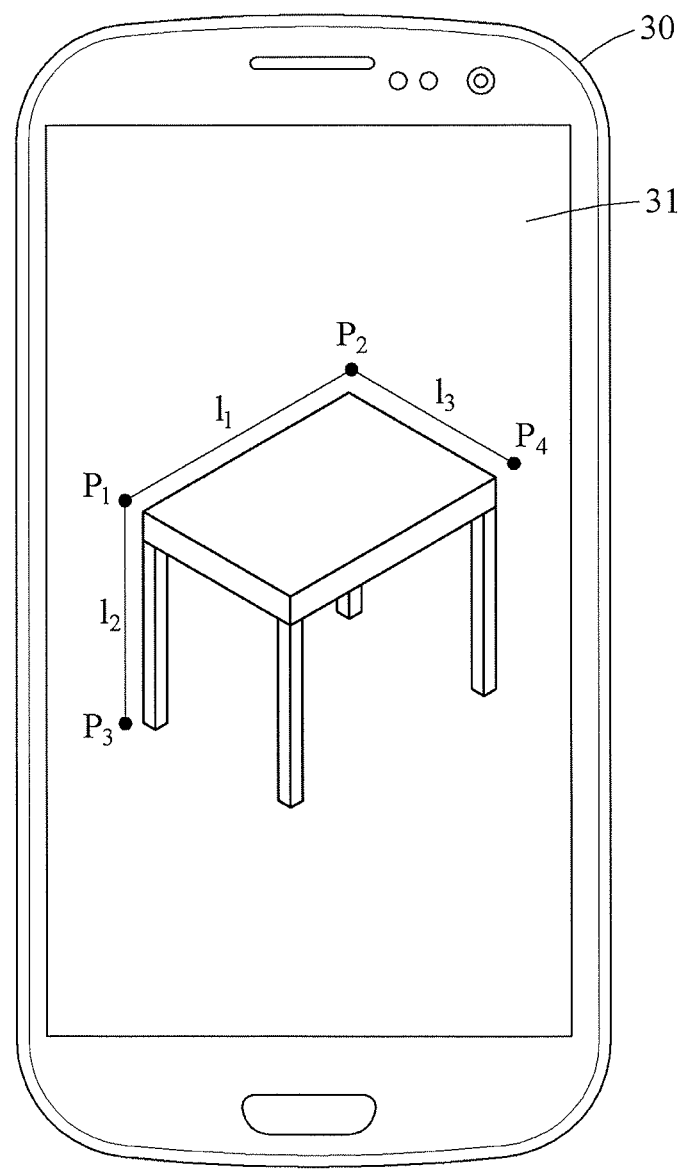
FIG. 8 illustrates another example of an operation of a measurement application according to an embodiment.

FIG. 8 illustrates another example of an operation of a measurement application according to an embodiment.

Referring to FIG. 8, the application controller 380 may change the settings of the position recognizer 320 to settings for recognizing a position designated through the user terminal 30 as the position at which the pulled-out length information is to be output. In this example, the position recognizer 320 may form a virtual line L1 connecting a predetermined point P1 and another predetermined point P2 designated by the user through the user terminal. The position recognizer 320 may recognize virtual lines L1, L2, and L3 even when a plurality of points P1, P2, P3, and P4 is designated through the user terminal 30. Further, the position recognizer 320 may determine an order of the virtual lines, such that the user may measure the object by setting an order to output lengths.

In this example, an image may be inserted into the screen of the user terminal 30 through the image inserter 360. The user may designate points through the image, and thus it may be easy to designate the points.

The length outputter 330 may sequentially output the pulled-out length information or the length measurement information received from the length measurement device 10, in the order of the virtual lines L1, L2, and L3 recognized by the position recognizer 320.

In this example, the cross-sectional area and the volume of the object may be calculated and output by calculating the pulled-out length information and the measurement distance information through the logic operation unit 340. Further, the 3D modeler 350 may also generate a 3D model through connection of the virtual lines L1, L2, and L3.

Figure 9:
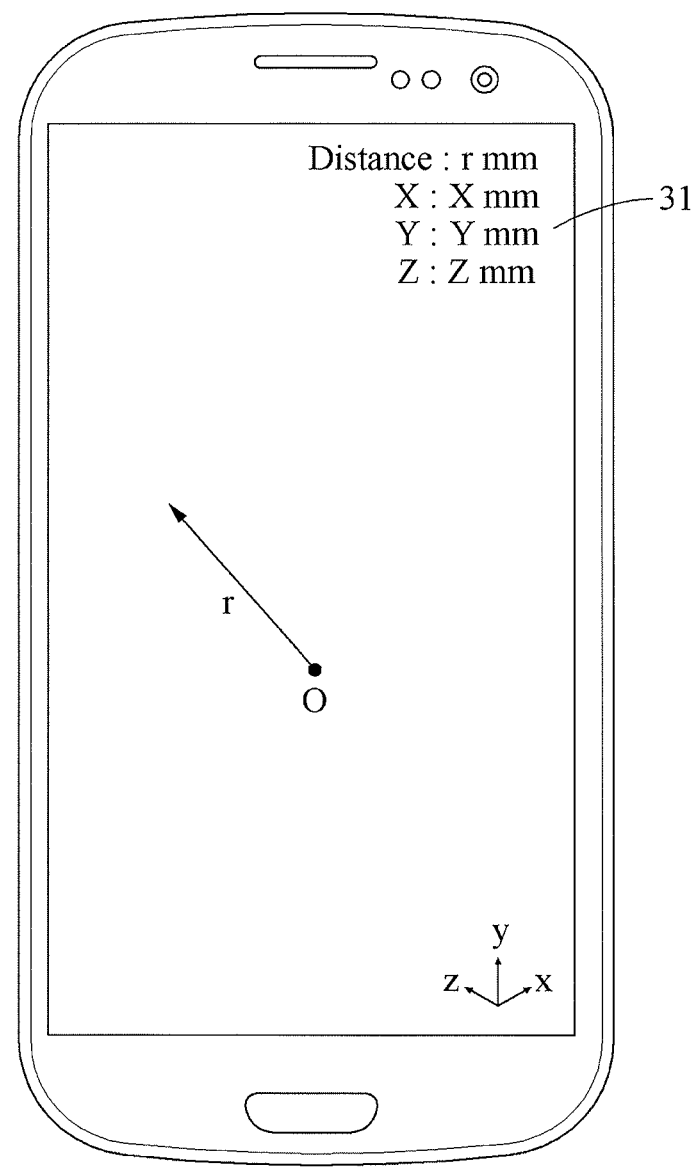
FIG. 9 illustrates still another example of an operation of a measurement application according to an embodiment.

FIG. 9 illustrates still another example of an operation of a measurement application according to an embodiment.

Referring to FIG. 9, the application controller 380 may change the setting of the position recognizer 320 to settings for recognizing a position at which the measurement distance information is to be output as a line based on the predetermined origin and the angle information. In this example, the length outputter 330 may generate a virtual line r based on the predetermined origin O, the distance of the measurement distance information, and the angle information. In this example, the logic operation unit 340 may correct the direction angle and the gradient by generating the angle in the angle information based on the horizontality information of the length measurement device 10, and provide the same to the length outputter 330. Further, the logic operation unit 340 may output the measurement distance information to the screen by calculating the X-axial, Y-axial and Z-axial distances based on the corrected angle information. Here, the 3D modeler 350 may also generate a 3D model through the calculated X-axial, Y-axial and Z-axial distances.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

The invention claimed is:

1. A length measurement device, comprising:
 a tape wound on a reel received in a case and configured to measure a length of an object by pulling one end thereof out of the case, the tape with a barcode formed on one surface thereof;
 a first measurer configured to generate a first measurement value with respect to a pulled-out length of the tape by recognizing the barcode of the tape;
 a second measurer configured to generate a second measurement value with respect to the pulled-out length of the tape by sensing a rotation angle of the reel; and
 a controller configured to mutually correct the first measurement value and the second measurement value and convert the corrected first and second measurement values into pulled-out length information of the tape.

2. The length measurement device of claim 1, further comprising:
 a storage configured to store the pulled-out length information;
 a display configured to convert the pulled-out length information into a value and display the value; and
 a stopper configured to restrict a pull-out of the tape,
 wherein the controller is configured to control the stopper based on the stored pulled-out length information, when the pulled-out length information of the tape stored in the storage is output to the display.

3. The length measurement device of claim 2, further comprising:
 a distance measurer provided on one side of the case and configured to generate measurement distance information by remotely measuring a distance to the object.

4. The length measurement device of claim 3, wherein the storage is further configured to store the measurement distance information, and
 the controller is configured to control the stopper based on the stored measurement distance information, when the measurement distance information stored in the storage is output to the display.

5. The length measurement device of claim 3, wherein the distance measurer further comprises:
 a distance measurement sensor configured to measure the distance to the object;
 an angle adjuster configured to adjust a measurement angle of the distance measurement sensor; and
 an angle sensor configured to generate angle information by sensing a direction angle and a gradient of the angle adjuster.

6. The length measurement device of claim 3, further comprising:
 an electronic level configured to generate horizontality information by measuring a horizontal level of the length measurement device.

7. A length measurement system, comprising:
 a length measurement device configured to mutually correct a first measurement value and a second measurement value and convert the corrected first and second measurement values into pulled-out length information of a tape configured to be pulled out of a case to measure a length of an object, and transmit the pulled-out length information, the first measurement value being generated by recognizing a barcode formed on one surface of the tape and the second measurement value being generated by sensing a rotation angle of a reel on which the tape is wound; and
 a user terminal including a measurement application configured to receive the pulled-out length information and visually display a pulled-out length of the tape.

8. The length measurement system of claim 7, wherein the measurement application comprises:
 a second communicator configured to receive the pulled-out length information;
 a position recognizer configured to recognize a position at which the pulled-out length information is to be output;
 a length outputter configured to output the pulled-out length information at the recognized position on a screen of the user terminal; and
 a logic operation unit configured to calculate and output a cross-sectional area and a volume of the object by calculating the pulled-out length information.

9. The length measurement system of claim 8, wherein the position recognizer is configured to recognize an axis X, Y or Z as the position at which the pulled-out length information is to be output, based on a predetermined origin.

10. The length measurement system of claim 9, wherein the measurement application further comprises:
 a 3D modeler configured to model the pulled-out length information of the axis X, Y or Z in a 3D form.

11. The length measurement system of claim 8, wherein the position recognizer is configured to recognize a position designated through user terminal as the position at which the pulled-out length information is to be output.

12. The length measurement system of claim 8, wherein the measurement application further comprises:
 an image inserter configured to insert an image designated through the user terminal as a background on the screen of the user terminal.

13. The length measurement system of claim 8, wherein the length measurement device further comprises:
 a stopper configured to restrict the pulled-out length of the tape, and
 the measurement application further comprises:
 a pull-out setter configured to receive pulled-out length information input through the user terminal, and generate a pull-out setting signal to control the stopper based on the received pulled-out length information.

14. The length measurement system of claim 8, wherein the length measurement device comprises:
 a distance measurer including a distance measurement sensor configured to generate measurement distance information by remotely measuring a distance to the object, an angle adjuster configured to adjust a measurement angle of the distance measurement sensor, and an angle sensor configured to generate angle information by sensing a direction angle and a gradient of the angle adjuster.

15. The length measurement system of claim 14, wherein the position recognizer is configured to recognize a position at which the measurement distance information is to be output, based on a predetermined origin and the angle information,
  the length outputter is configured to output the measurement distance information at the recognized position, and
  the logic operation unit is configured to output the measurement distance information by calculating X-axial, Y-axial and Z-axial distances based on the angle information.

* * * * *